United States Patent [19]

Nagase et al.

[11] Patent Number: 4,459,534
[45] Date of Patent: Jul. 10, 1984

[54] METHOD FOR CONTROLLING INDUCTION MOTOR AND APPARATUS THEREFOR

[75] Inventors: Hiroshi Nagase, Hitachi; Toshiaki Okuyama, Ibaraki, both of Japan

[73] Assignee: Hitachi, Ltd., Tokyo, Japan

[21] Appl. No.: 381,294

[22] Filed: May 24, 1982

[30] Foreign Application Priority Data

May 29, 1981 [JP] Japan .................................. 56-83195

[51] Int. Cl.³ .............................................. H02P 5/40
[52] U.S. Cl. .................................... 318/808; 318/803; 318/811
[58] Field of Search ......................... 318/803, 807–811

[56] References Cited

U.S. PATENT DOCUMENTS

| | | | |
|---|---|---|---|
| 4,310,791 | 1/1982 | Akamatsu | 318/808 |
| 4,322,671 | 3/1982 | Kawada et al. | 318/811 |
| 4,356,544 | 10/1982 | Ono et al. | 318/811 |
| 4,364,109 | 12/1982 | Okado et al. | 318/811 |
| 4,377,779 | 3/1983 | Plunkett | 318/811 |

Primary Examiner—David Smith, Jr.
Attorney, Agent, or Firm—Antonelli, Terry & Wands

[57] ABSTRACT

A control apparatus for induction motor comprising an induction motor driven by a power converter, a circuit for producing an effective current command value for the induction motor on the basis of a speed command value and an actual speed value, a circuit for producing a slip frequency corresponding to the magnitude of the effective current command value, and a circuit for producing a primary frequency command value on the basis of the slip frequency and the actual speed value, the output of the power converter being controlled on the basis of the frequency command value, the effective current command value and a given exciting current or voltage command value, wherein the control apparatus further comprises a current component detecting circuit for detecting the primary current of the induction motor so as to produce in the form of a DC signal an actual effective current value which is an effective component of the detected primary current, a first current control circuit for producing an effective voltage command value in the form of a DC signal on the basis of the actual effective current value and the effective current command value, and a converter controlling circuit for controlling the power converter to produce output on the basis of the effective voltage command value, the frequency command value, and a given exciting voltage command value in the form of a DC signal. The current component detecting circuit preferably further produces in the form of a DC signal an actual exciting current value which is an exciting component of the detected primary current, and the controlling apparatus may further comprise a second current controlling circuit for producing the exciting voltage command value on the basis of the actual exciting current value and the predetermined exciting current command value.

11 Claims, 17 Drawing Figures

METHOD FOR CONTROLLING INDUCTION MOTOR AND APPARATUS THEREFOR

BACKGROUND OF THE INVENTION

1. Field of the Invention

This invention relates to a method of controlling an induction motor and apparatus therefor, and particularly to a method of controlling an induction motor and apparatus therefor in which torque control can be attained with high accuracy.

2. Description of Prior Art

There have been proposed two methods of controlling an induction motor wherein the control is made at the primary and at the secondary side, respectively. For example, U.S. Pat. No. 3,824,437 (corresponding to West German Laid-open Specification No. 1,941,312) discloses an induction motor controlling method which belongs in the category of the primary-side controlling method and which is called the vector control in which the primary current of the induction motor is decomposed into an exciting component which is the component in the same direction as that of the axis of magnetic flux and an effective component which is the component perpendicular to the exciting component, so that the respective components can be controlled separately. By this vector control, the torque control in the induction motor can be attained with high accuracy as in the DC motor.

In this vector control, it is necessary to detect the flux axis position as a reference signal for the decomposition of the primary current into its components. The flux axis position can be detected by a magnetic flux detector mounted on the induction motor.

However, the induction motor must be provided with such a flux detector, and therefore this vector control cannot be adopted in the general-purpose motors. In addition, there is a practical problem of providing a signal line for transmitting the output signal of the flux detector to the control apparatus.

In order to solve this problem, there has been proposed a method of calculating and detecting the flux axis position within the control apparatus, as, for example, disclosed in the specification of Japanese Patent Application Laid-open No. 11125/1976.

As will be described in detail later, this method, however, has a problem that the speed control is unstable at high operating frequencies so that a predetermined speed response can not be obtained and therefore accurate speed control can not be attained.

SUMMARY OF THE INVENTION

It is therefore an object of this invention to provide a method of controlling an induction motor and apparatus therefor in which the speed control can be performed with high accuracy irrespective of the operating frequency of the induction motor.

The feature of this invention is that the primary current of the induction motor is detected and decomposed into an exciting component and an effective component so as to obtain DC signals corresponding to the respective components, whereby control is made such that the deviation of each of the DC signals from the command value therefor is made zero.

The other objects and features of this invention will become apparent from the detailed description which will be made hereunder with referrence to the accompanying drawings.

DESCRIPTION OF THE PREFERRED EMBODIMENTS

Before describing embodiments of this invention, the prior art will be explained with reference to FIG. 1 for understanding this invention with ease.

Figure 1:
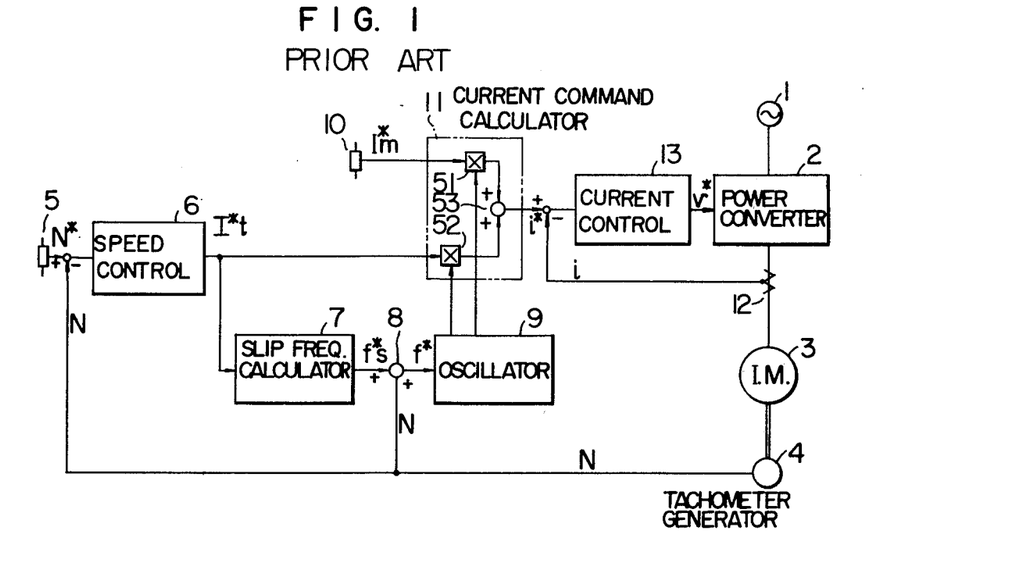
FIG. 1 is a block diagram of an example of prior art induction motor controlling apparatus.

Referring to FIG. 1, numeral 1 represents an AC power source, 2 a power converter for producing a voltage proportional to a voltage command value v* which will be described later, 3 an induction motor to be driven by the power converter 2, and 4 a speed detector for detecting the rotation speed of the induction motor 3 to produce an output signal N. Numeral 5 represents a speed command circuit for producing a speed command value N*, and 6 a speed control circuit for producing a signal proportional to the deviation of the actual speed value N from the speed command value N*. The output signal of the speed control circuit 6 serves as a torque current (effective current) command value $I_t^*$ of a current component perpendicular to the magnetic flux axis of the induction motor 3. Numeral 7 denotes a slip frequency calculating circuit for determining a slip frequency command value $f_s^*$ of the induction motor 3 in proportion to the torque current command value $I_t^*$, and 8 an adder for adding the slip frequency command value $f_s^*$ to the actual speed value N to produce a primary frequency command value f* of the induction motor 3. Numeral 9 designates an oscillator for generating a sinusoidal signal having the same frequency as the primary frequency command value f*. In particular, the oscillator 9 generates two signals of sin ($2\pi f^*$ t) and cos ($2\pi f^*$ t) which are 90° out of phase, and in which t is time. Numeral 10 represents an exciting current command circuit for producing an exciting current command value $I_m^*$ of a current component parallel to the magnetic flux axis of the induction motor 3, and 11 a current command calculating circuit for calculating a command signal $i^*$ for instructing instantaneous primary current values of the induction motor 3. This circuit 11 produces the instantaneous current command value $i^*$ by calculating the following equation:

$$i^* = I_m^* \sin(2\pi f^* t) + I_t^* \cos(2\pi f^* t) \tag{1}$$

The current command calculating circuit 11 comprises multipliers 51 and 52 and an adder 53 for its calculating operation. Numeral 12 denotes a current detector for detecting the instantaneous primary current value $i$ of the induction motor 3, and 13 a current controlling circuit which operates in response to the deviation of the actual instantaneous current value $i$ from the command value $i^*$ therefor to produce a command signal $v^*$ for instructing the instantaneous value of the output voltage (fundamental wave) from the power converter 2, i.e. the instantaneous value of the primary phase voltage of the induction motor 3.

With such an arrangement, the vector control operation will provide good speed control with high accuracy as well as fast response since the magnetic flux can be maintained constant and the torque current perpendicular to the flux can be controlled instantaneously to be the command value.

The circuit arrangement of FIG. 1 is substantially the same as that disclosed in the above-mentioned Japanese Patent Application Laid-open No. 11125/1976, and has the following drawback.

In the current control system, which is a feedback control system, there is an inherent response delay and, as apparent from its frequency characteristic, the actual instantaneous current value $i$ decreases below the command value $i^*$ and the phase thereof becomes delayed as the frequency of the instantaneous current command value $i^*$ increases.

The power converter 2 is constituted by switching elements such as thyristors. It takes a certain time for the switching element to turn on and off and thus the switching speed has a limit. Since the current control system is a system for controlling the magnitude of current in accordance with the on-off operation of the switching element, the limited switching speed will restrict the frequency response of the current control system. The actual calculation of the frequency response of the current control system will teach the fact that it is practically impossible to select the frequency response to be such a sufficiently large value that the response delay of the current control system can be neglected when the induction motor is rotated at its rated frequency. Consequently, the response delay of the current controlling system becomes so great as not to be neglected as the rotation frequency of the motor increases.

When the motor is rotated at a frequency at which the response delay of the current controlling system is serious, the following trouble occurs. Assume now that a constant-torque load is applied to the motor in accordance with a constant speed command. If the exciting current command value $I_m^*$ is always constant, and the torque current command value $I_t^*$ is the same as that at a very low speed, the actual primary current $I$ is smaller than the command value due to the response delay in the current controlling system. The torque is, therefore, reduced to lower the rotation speed. The torque current command value $I_t^*$ is therefore increased by the amount corresponding to the compensation for the reduction of the speed. Since the torque current command value $I_t^*$ increases, the primary current $I$ becomes a value substantially equal to that required to generate the same torque at a very low speed. Then, the slip frequency $f_s^*$ increases because it varies in proportion to the torque current command value $I_t^*$. As a result, the current components are not properly provided, and thus the actual exciting current $I_m$ is smaller than a predetermined value and the actual torque current $I_t$ is larger than a predetermined value which is required to produce a certain torque.

Thus, in spite of the intention that the torque control is performed with a constant value of the exciting current $I_m$, namely with constant magnetic flux, the magnetic flux can not be maintained constant in a range where the rotation frequency is high. Since the response delay of the current control system becomes large as the rotation frequency increases, this tendency becomes remarkable.

The speed controlling system serves to control the torque of the motor, and therefore the gain of the loop transfer function of the speed controlling system is proportional to the magnetic flux. Since the magnetic flux decreases as the rotation frequency increases, as described above, the gain of the loop transfer function of the speed control system decreases with the increase of the rotation frequency, so that the speed control becomes unstable at high rotation frequencies.

This invention is to provide a speed controlling system in which accurate and stable speed control can be made even at high rotation frequencies.

Figure 2:
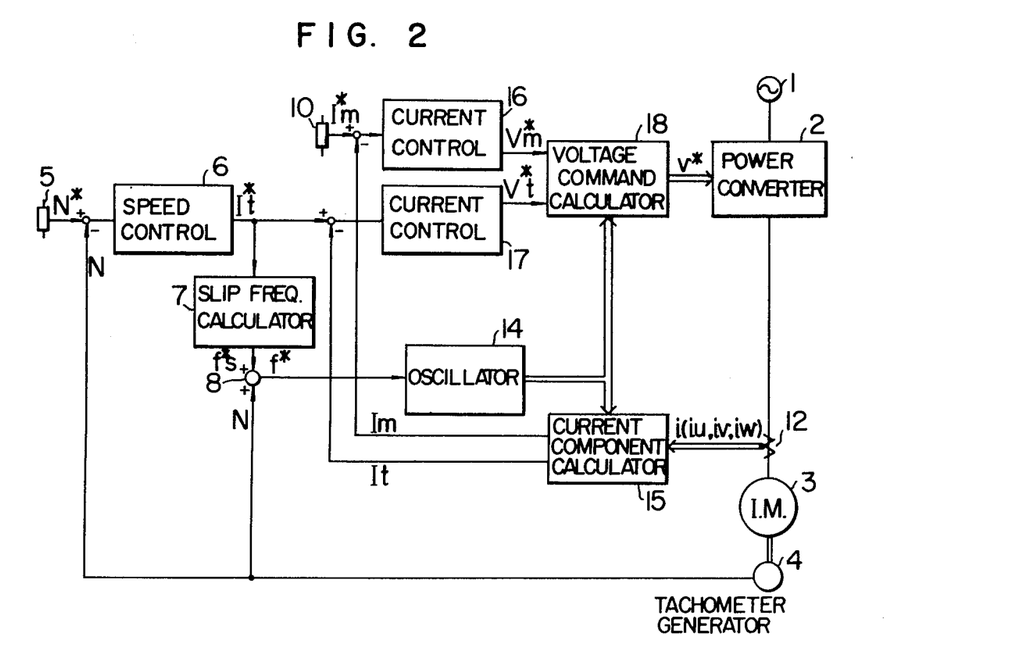
FIG. 2 is a block diagram of an embodiment of the induction motor controlling apparatus according to this invention.

FIG. 2 shows an embodiment of this invention.

In FIG. 2, like elements corresponding to those of FIG. 1 are identified by the same reference numerals. Numeral 14 represents an oscillator supplied with the primary frequency command $f^*$ to produce sinusoidal signals having the frequency $f^*$, and 15 designates a current component calculating circuit responsive to the output signal of the oscillator 14 to calculate the signal components of the primary current detection signal $i$. The circuit 15 detects, as will be described later, the exciting current $I_m$ which is a current component parallel to the magnetic flux axis, and the torque current $I_t$ which is a current component perpendicular to the same to produce DC signals representing these detected currents $I_m$ and $I_t$. Numeral 16 represents a first current controlling circuit responsive to the deviation of the actual exciting current value $I_m$ from the command value $I_m^*$ to produce a voltage command value $V_m^*$ which is parallel to the magnetic flux axis of the primary phase voltage of the induction motor 3. Numeral 17 designates a second current controlling circuit responsive to the deviation of the actual torque current value $I_t$ from the command value $I_t^*$ to produce a voltage command value $V_t^*$ which is perpendicular to the magnetic flux axis of the primary phase voltage of the induction motor 3. Numeral 18 represents a voltage command calculating circuit supplied with the voltage command values $V_m^*$ and $V_t^*$ to calculate the instantaneous voltage command valve $v^*$.

The operation of the circuit arrangement of FIG. 2 will be now described.

The torque current command $I_t^*$ from the speed controlling circuit 6 and the slip frequency command value $f_s^*$ have a relationship given by $$f_s^* = \frac{1}{2\pi} \cdot \frac{r_2'}{l_m + l_2'} \cdot \frac{I_t^*}{I_m^*} \quad (2)$$

where $r_2'$ and $l_2'$ are the equivalent primary values converted from the secondary resistance $r_2$ and secondary leakage inductance $l_2$ of the induction motor 3, and $l_m$ is the exciting inductance.

From Eq. (2), it will be seen that if the exciting current command value $I_m^*$ is constant, $f_s^*$ is proportional to $I_t^*$. The slip frequency calculating circuit 7 effects calculation in accordance with Eq. (2) to produce the slip frequency command value $f_s^*$. There is the following relationship among the slip frequency $f_s$, electrical rotation frequency $f_r$ and primary frequency f:

$$f = f_r + f_s \quad (3)$$

The frequency $f_r$ is determined by the rotation speed N of the induction motor 3 as $$f_r = P/2 \cdot N \quad (4)$$

where P is the number of poles. In Eq. (4), if the rotation frequency $f_r$ is expressed in $H_z$, the rotation speed N is expressed in r.p.s. Accordingly, in the adder 8 the rotation speed N is first converted into the electrical rotation frequency $f_r$ based on Eq. (4) and then added to the slip frequency command value $f_s^*$. Namely, the primary frequency command value f* from the adder 8 is therefore expressed by $$f^* = \frac{P}{2} \cdot N + f_s^* \quad (5)$$
$$= f_r + f_s^*$$

The primary frequency command value f* has a positive polarity when, for example, the induction motor 3 is rotated in the forward direction because the detected value N from the speed detector 4 and the command value $f_s^*$ from the slip frequency calculating circuit 7 are positive. When the motor is rotated in the reverse direction, the command value f* has a negative polarity.

The oscillator 14 produces a sinusoidal signal having the same frequency as the primary frequency command value f* and the phase coincident with that of the magnetic flux axis of the induction motor 3.

Figure 3:
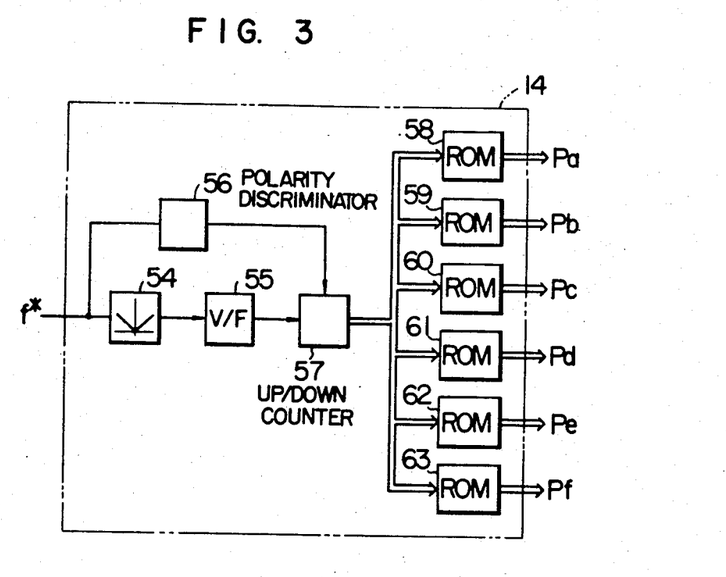
FIG. 3 is a block diagram of an arrangement of an oscillator 14 in FIG. 2.

FIG. 3 shows an example of an arrangement of the oscillator 14.

In FIG. 3, numeral 54 represents an absolute value circuit, 55 a V/F converter for producing a pulse train of the frequency proportional to the input signal and 56 a polarity discriminator for discriminating the polarities of the input signal f*. The polarity discriminator 56 produces a high-level signal when the polarity of the input signal f* is positive, and produces a low-level signal when it is negative. Numeral 57 represents an up/down counter (hereinafter, abbreviated U/D counter) for counting the output of the V/F converter 55. The counting up or down is determined depending on the polarity of the output signal of the polarity discriminator 56. When the signal f* is positive, the oscillator 14 produces a normal phase output signal, but when it is negative, the oscillator 14 produces a reverse phase output signal, thus the U/D counter 57 determining the counting direction and producing a digital signal corresponding to the value f*·t. Numerals 58 to 63 represent ROMs for producing signals corresponding to the output of the U/D counter 57, or the digital signals corresponding to the following signals given by $$\begin{aligned}
p_a &= \sin(2\pi f^* t) \\
p_b &= \sin\left(2\pi f^* t - \frac{2}{3}\pi\right) \\
p_c &= \sin\left(2\pi f^* t - \frac{4}{3}\pi\right) \\
p_d &= \cos(2\pi f^* t) \\
p_e &= \cos\left(2\pi f^* t - \frac{2}{3}\pi\right) \\
p_f &= \cos\left(2\pi f^* t - \frac{4}{3}\pi\right)
\end{aligned} \quad (6)$$

The production of the signals $p_a$ to $p_f$ in Eq. (6) from the oscillator 14 will be described in detail with reference to FIG. 6.

Figure 6:
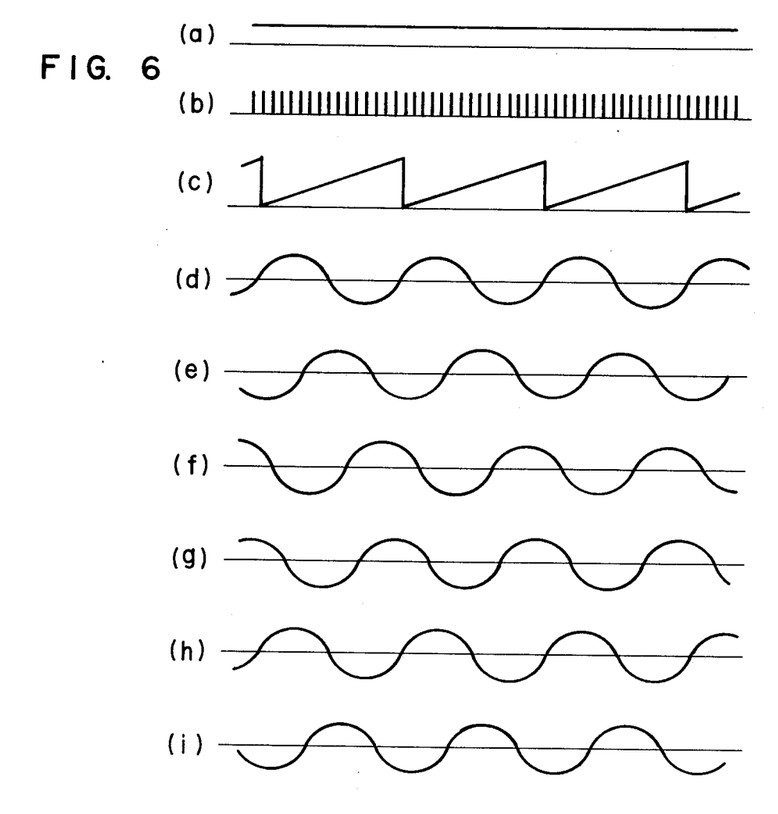
FIG. 6 is a waveform diagram useful for explaining the operation of the oscillator shown in FIG. 3.

FIG. 6 shows the waveforms generated by the oscillator 14 shown in FIG. 3. FIG. 6(a) shows the input signal to the V/F oscillator 55, the magnitude of which is equal to the primary frequency command value f*. The waveform shown in FIG. 6(b) is the output signal from the V/F converter 55 in the form of a pulse train having the frequency proportional to the primary frequency command value f*, and that shown in FIG. 6(c) is the output signal from the U/D counter 57, which is conceptually illustrated as an analog signal. The U/D counter 57 counts the input signal, or the number of pulses and produces an output representing the count. The overflowing of the contents of the counter is equivalent to the reset thereof and therefore the output of the counter 57 is substantially a sawtooth wave as shown by FIG. 6(c). In order to make the period of the sawtooth wave correspond to that of the primary frequency f*, the relationship between the counter output and the electrical angle in the primary frequency region is arranged such that the counter output with all the bits "0" corresponds to the electrical angle value 0°, while the counter output with all the bits "1" corresponds to the electrical angle value 360°. FIGS. 6(d) to 6(i) show the output signals $p_a$ to $p_f$ from the ROMs 58 to 63 as analog signals corresponding to $p_a$ to $p_f$ in Eq. (6), respectively. Since the output of the U/D counter 57 is made to correspond to a value from 0° to 360° of electrical angle δ of the primary frequency f*, the angle δ is equal to $2\pi f^* t$. Thus, the ROMs 58 to 63 receive the output of the counter 57 and produce the digital signals $p_a$ to $p_f$ shown in Eq. (6). As to the signals $p_a$ to $p_f$, since the output frequency of the V/F converter 55 is changed in proportion to the input signal f*, the sawtooth wave frequency is also changed in proportion to the same, and consequently the sinusoidal wave signals from the ROMs are changed in proportion to the signal f*.

With such a construction, the oscillator can accurately generate the sinusoidal signals of the frequency always proportional to the input signal over the range from a very low frequency to the rated frequency of the motor.

The current component calculating circuit 15 is supplied with the primary current i (instantaneous values $i_U$, $i_V$ and $i_W$) detected by the current detector 12 and the sinusoidal signals $p_a$ to $p_f$ from the oscillator 14 to produce the torque current $I_t$ and exciting current $I_m$ proportional to the instantaneous values of the primary current $i_U$, $i_V$ and $i_W$ of each phase by computation.

Figure 4:
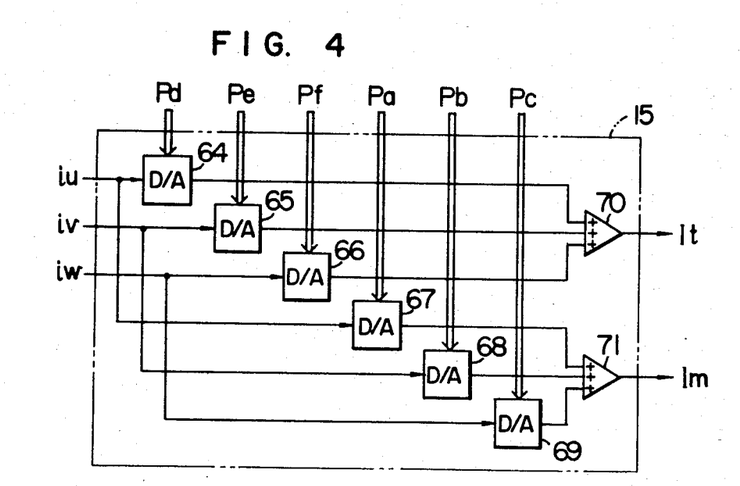
FIG. 4 is a block diagram of an arrangement of a current command arithmetic circuit 15 in FIG. 2.

FIG. 4 shows an example of arrangement of the current component calculating circuit 15. In FIG. 4, numerals 64 to 69 represent D/A converters for converting digital signals to analog signals. These converters are of the multiplier type in which the maximum value of the output is determined by the reference input of $i_U$, $i_V$ and $i_W$. Numerals 70 and 71 denote adders. The instantaneous valves $i_U$, $i_V$ and $i_W$ of the primary currents detected by the current detector 12 are expressed by $$\left. \begin{array}{l} i_U = I \sin (2\pi f t + \theta) \\ i_V = I \sin \left( 2\pi f t + \theta - \frac{2}{3}\pi \right) \\ i_W = I \sin \left( 2\pi f t + \theta - \frac{4}{3}\pi \right) \end{array} \right\} \quad (7)$$

In Eq. (7), angle $\theta$ is the angle between the magnetic flux axis and the current vector. Therefore, the torque current $I_t$ and the exciting current $I_m$ are expressed by $$\left. \begin{array}{l} I_t = I \sin \theta \\ I_m = I \cos \theta \end{array} \right\} \quad (8)$$

Figure 8:
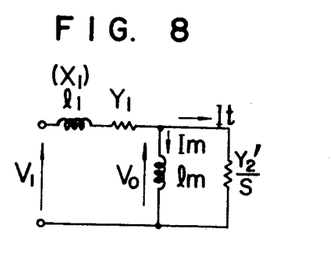
FIG. 8 is an equivalent circuit diagram of the induction motor.
Figure 9A:
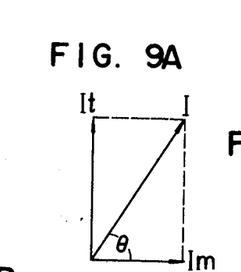
FIGS. 9A and 9B are vector diagrams of the effective and exciting components of current and voltage of the motor at a low speed.
Figure 9B:
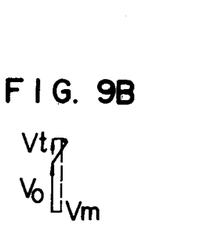

The reason why $I_t$ and $I_m$ can be expressed by Eq. (8) will be explained with reference to FIGS. 8 to 10. The equivalent circuit for the induction motor can be illustrated in FIG. 8, in which the secondary leakage reaction is very small and hence neglected. In FIG. 8, $r_1$ represents a primary resistance, $r_2'$ the equivalent primary valve converted from a secondary resistance $r_2$, $l_1$ a primary leakage inductance, $l_m$ an exciting inductance, S a slip, $V_o$ an exciting voltage, and V a primary voltage. The primary current I is divided into the torque current $I_t$ flowing into the secondary circuit and the exciting current $I_m$ flowing into the exciting circuit. The vector diagrams for the relation among I, $I_t$ and $I_m$ and that among $V_o$, $V_t$ and $V_m$ are shown in FIGS. 9A and 9B and FIGS. 10A and 10B. FIGS. 9A and 9B are for a low speed and FIGS. 10A and 10B for a high speed. The $\theta$ as given above is the angle between I and $I_m$. From the illustrations it will be understood that the $I_t$ and $I_m$ can be expressed as Eq. (8).

The torque current $I_t$ in Eq. (8) is expanded on the basis of the idea of the rectangular coordinates, into $$I_t = I \sin \theta \quad (9)$$

$$= \frac{1}{3} \Big[ I\{\sin \theta + \sin (4\pi f^* t + \theta)\}$$

$$+ I\left\{ \sin \theta + \sin \left( 4\pi f^* t - \frac{2}{3}\pi + \theta \right) \right\}$$

$$+ I\left\{ \sin \theta + \sin \left( 4\pi f^* t - \frac{4}{3}\pi + \theta \right) \right\} \Big]$$

$$= \frac{2}{3} \Big\{ I \sin (2\pi f^* t + \theta) \cos (2\pi f^* t)$$

-continued $$+ I \sin \left( 2\pi f^* t - \frac{2}{3}\pi + \theta \right) \cos \left( 2\pi f^* t - \frac{2}{3}\pi \right)$$

$$+ I \sin \left( 2\pi f^* t - \frac{4}{3}\pi + \theta \right) \cos \left( 2\pi f^* t - \frac{4}{3}\pi \right) \Big\}$$

Substituting Eqs. (6) and (7) into Eq. (9) will yield $$I_t = K(i_U p_d + i_V p_e + i_W p_f) \quad (10)$$

where K is $\frac{2}{3}$.

From Eq. (10) it will be apparent that the torque current $I_t$ determined by the vector sum of three phase AC signals can be detected as a DC amount.

Similarly, the exciting current $I_m$ is expanded and rearranged as $$I_m = K(i_U p_a + i_V p_b + i_W p_c) \quad (11)$$

and therefore it can be detected as a DC amount.

The current component calculating circuit 15 calculates Eqs. (10) and (11) to detect the torque current $I_t$ and exciting current $I_m$.

The current control circuit 16 produces the voltage command value $V_m^*$ proportional to the deviation of the actual exciting current value $I_m$ from the command value $I_m^*$ and the current control circuit 17 produces the voltage command value $V_t^*$ proportional to the deviation of the actual torque current value $I_t$ from the command value $I_t^*$. The $V_m^*$ is a command value of the primary voltage component in the same direction as the magnetic flux axis, and the $V_t^*$ is a command value of the primary voltage component in the direction perpendicular to the magnetic flux axis. Since all the current command values $I_m^*$ and $I_t^*$ and the actual current values $I_m$ and $I_t$ are in the form of DC signals, the current controlling circuits 16 and 17 are independent of the height of the primary frequency f. When the voltage command values $V_t^*$ and $V_m^*$ are produced from the current controlling circuits 16 and 17, the voltage command calculating circuit 18 calculates the instantaneous values $v_U^*$, $v_V^*$ and $v_W^*$ of the primary phase voltages of the induction motor 3 as $$\left. \begin{array}{l} v_U^* = V_t^* p_d + V_m^* p_a \\ v_V^* = V_t^* p_e + V_m^* p_b \\ v_W^* = V_t^* p_f + V_m^* p_e \end{array} \right\} \quad (12)$$

Figure 5:
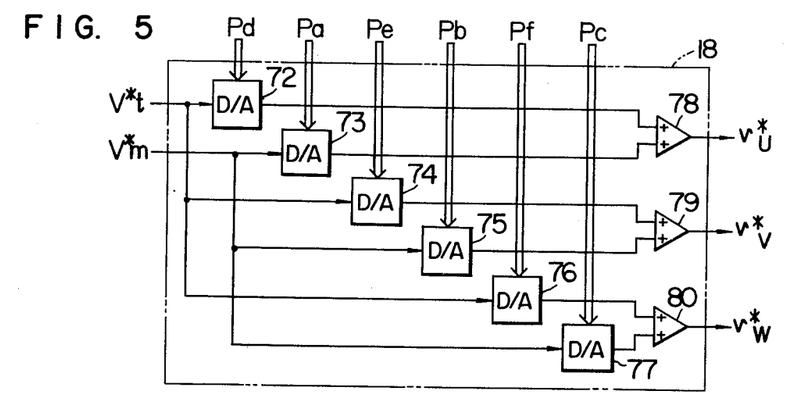
FIG. 5 is a block diagram of an arrangement of a voltage command calculating circuit 18 in FIG. 2.

FIG. 5 shows an example of the voltage command calculating circuit 18 for calculating Eq. (12).

In FIG. 5, numerals 72 to 77 represent D/A converters for the same operation as that of the D/A converters 64 to 69, and 78 to 80 adders.

Thus, when the primary voltage command value $V^*$ is produced, the power converter 2 produces a fundamental wave voltage proportional to the command value $v^*$. Consequently, the primary current in the induction motor 3 becomes proportional to the command value and the current components $I_t$ and $I_m$ are controlled to be always coincident with the command values $I_t^*$ and $I_m^*$, respectively.

While in the above description the current components $I_t$ and $I_m$ are calculated directly from the three-phase primary currents $i_U$, $i_V$ and $i_W$ and the three-phase primary voltage command values $v_U{}^*$, $v_V{}^*$ and $v_W{}^*$ are calculated directly from the voltage component command values $V_t{}^*$ and $V_m{}^*$, they may be obtained by conversion from three-phase to two-phase values and vice versa according to a known method. In other words, the three-phase AC currents $i_U$, $i_V$ and $i_W$ are converted to two-phase currents $i_a$ and $i_b$, and $I_t$ and $I_m$ are calculated from $$\left. \begin{array}{l} I_t = i_a p_a - i_b p_b \\ I_m = i_a p_d + i_b p_a \end{array} \right\} \quad (13)$$

Substituting the voltage component command values $V_t{}^*$ and $V_m{}^*$ for the following equation, $$\left. \begin{array}{l} v_a{}^* = V_t{}^* p_a + V_m{}^* p_d \\ v_b{}^* = -V_t{}^* p_d + V_m{}^* p_a \end{array} \right\} \quad (14)$$

will determine the two-phase AC command values $v_a{}^*$ and $v_b{}^*$. Then, these command values are converted to three-phase AC command values $v_U{}^*$, $v_V{}^*$ and $v_W{}^*$. Here, $p_a$ and $p_d$ are the same as those in Eq. (6). Thus, the computation of two-phase signals will enable the number of phases of the multiplier and oscillator outputs to be reduced, resulting in a simple arrangement.

In the embodiment of this invention, the current components $I_t$ and $I_m$ of the primary current are detected as DC amounts, and the current controlling circuits calculate on DC signals to finally control AC currents. Since the current controlling circuits treat DC signals, there is no response delay problem irrespective of the operation frequency. Therefore, a torque proportional to the torque command can always be obtained to control the speed with high accuracy.

This embodiment further has the following effect. If the compensation circuits of the current controlling circuits 16 and 17 have integrating elements provided, the ripple included in the currents $I_m$ and $I_t$ can be smoothed by the integrating operation of the compensation circuits, and therefore the current controlling circuits 16 and 17 can produce outputs $V_m{}^*$ and $V_t{}^*$ with no ripple. As a result, upon the PWM control, the voltage command has no noise so that the switching element of the power converter 2 can be prevented from erroneously turning on and off by the ripple.

Figure 7:
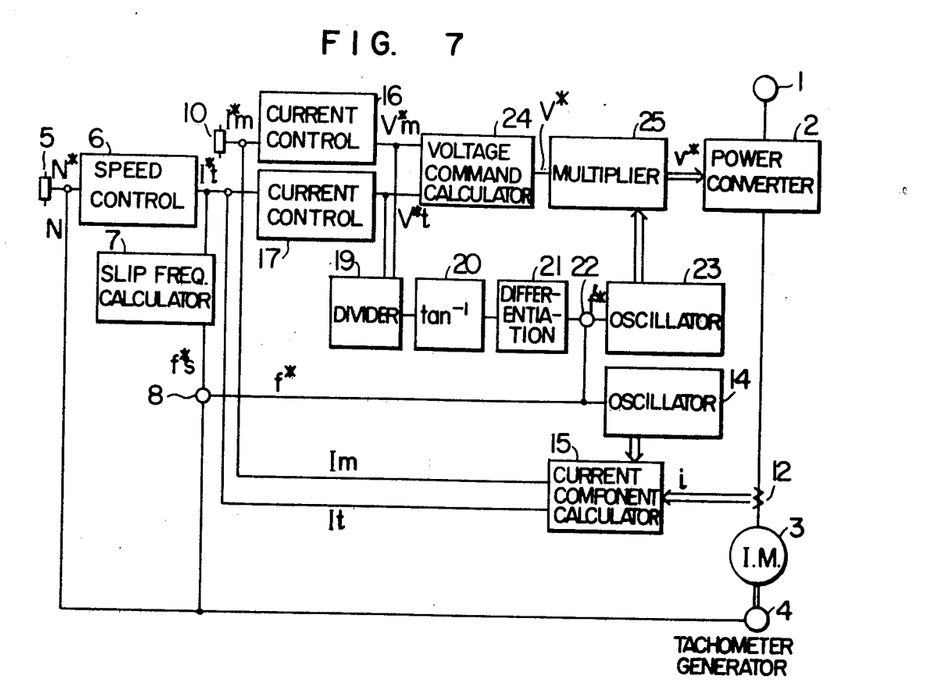
FIG. 7 is a block diagram of another embodiment of this invention.

FIG. 7 shows another embodiment of this invention.

In FIG. 7, like elements corresponding to those of FIG. 2 are identified by the same reference numerals. Numeral 19 represents a divider, and 20 an arc-tangent calculating circuit. The divider 19 and the arc-tangent calculating circuit 20 operate jointly to calculate the phase $\alpha$ of voltage with respect to the magnetic flux axis from the following equation:

$$\alpha = \tan^{-1} \frac{V_t{}^*}{V_m{}^*} \quad (15)$$

Numeral 21 represents a differentiation circuit, and 22 an adder. The differentiation circuit 21 and the adder 22 operate jointly to calculate the following equation:

$$f^* = f^* + 1/2\pi \cdot d\alpha/dt \quad (16)$$

Numeral 23 designates an oscillator which produces a sinusoidal wave having the phase of $$\int 2\pi f^* dt = 2\pi f^* t + \alpha \quad (17)$$

which is the integration of $2\pi f^*$, namely, sin $(2\pi f^* t + \alpha)$. The circuit for that purpose may be the oscillator 14 in FIG. 3, and the three phase outputs $p_a$, $p_b$ and $p_c$ suffice the purpose. Numeral 24 denotes a voltage command calculating circuit, which calculates the equation given by $$V^* = \sqrt{(V_m{}^*)^2 + (V_t{}^*)^2} \quad (18)$$

to produce the magnitude command value $V^*$ of the primary voltage.

Numeral 25 represents a multiplier circuit, which produces the instantaneous command value $v^*$ of the primary phase voltage from the calculation of, for example, for u-phase, $$v_U{}^* = V^* \sin(2\pi f^* t + \alpha) \quad (19)$$

While in the embodiment of FIG. 7 the voltage phase $\alpha$ is differentiated, the frequency command $f^*$ is added to the differentiated value and the sine wave signal is shifted in phase, the differentiation circuit 21 and the adder 22 may be omitted, and instead a phase shifter be inserted between the oscillator 23 and the multiplier 25 so that the output voltage from the oscillator 23 can be shifted in phase to obtain the same result as the Eq. (19).

In this way, the same effect as in the embodiment of FIG. 2 can also be obtained by separation of the primary voltage command $v^*$ into the magnitude and frequency commands. When the power converter 2 is a PWM inverter, easy control can be achieved by the separation of voltage command into magnitude and frequency commands as in the embodiment of FIG. 7, because the modulating wave and carrier are easily synchronized with each other in the PWM control and the output of the oscillator 23 may be a trapezoidal wave, but not sinusoidal wave. Under use of trapezoidal wave, since the fundamental wave included in the output voltage from the power converter 2 can be made large as compared with the use of sinusoidal waves, the efficiency of usage of the power converter can be increased.

While the exciting current command value is made constant as described above, this invention can of course be applied to the case where the exciting current command value is changed.

Figure 11:
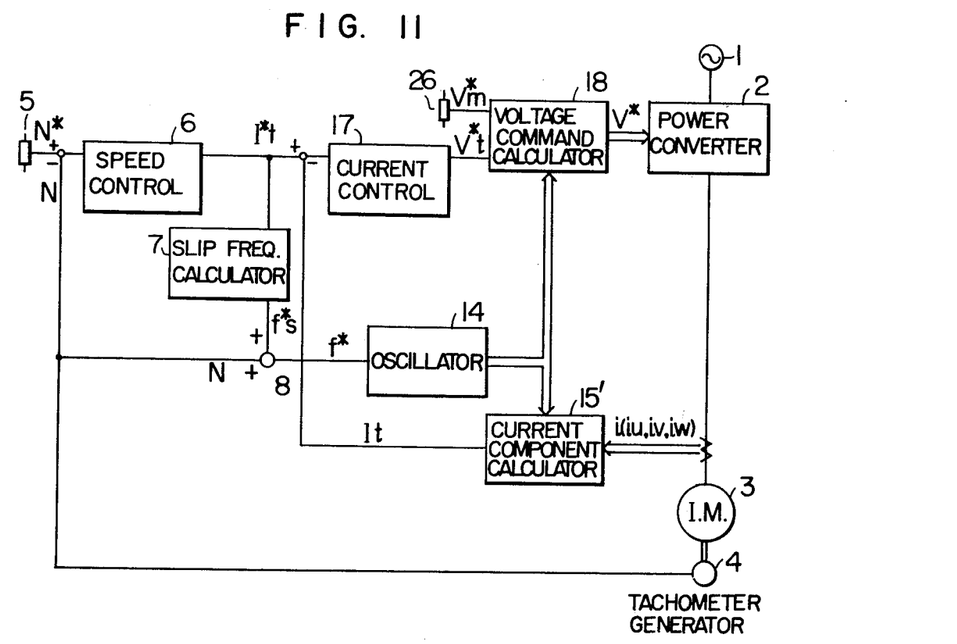
FIG. 11 is a block diagram of still another embodiment of this invention.

FIG. 11 shows still another embodiment of this invention. This embodiment is a modification of the embodiment of FIG. 2 and simpler than that of FIG. 2. Thus, the embodiment of FIG. 11 is inferior to that of FIG. 2 in accuracy of control, but more practical than that. In FIG. 11, like elements corresponding to those of FIG. 2 are identified by the same reference numerals.

Figures 10A, 10B:
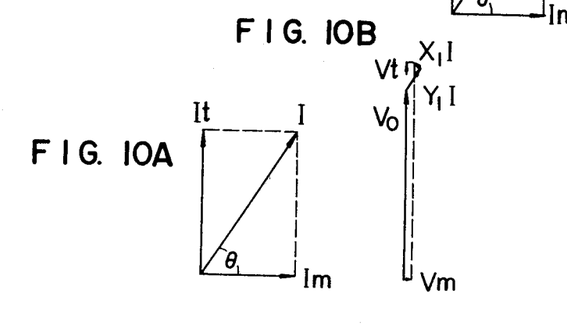
FIGS. 10A and 10B are vector diagrams of the effective and exciting components of current and voltage at a high speed.

From FIGS. 9B and 10B, it will be seen that the exciting component $V_m$ of the primary voltage $V$ is substantially constant independent of the speed. Therefore, in the case where extremely accurate control is not required, the exciting voltage command value $V_m{}^*$ is preselected to be a constant value in association with the necessary exciting current $I_m$. The embodiment of FIG. 11 is based on such idea.

Thus, the embodiment of FIG. 11 is different from that of FIG. 2 in that in the latter, the current component calculating circuit 15 is used to separate the primary current into the torque current component $I_t$ and exciting current component $I_m$ and calculate the exciting voltage command value $V_m^*$ on the basis of the exciting current command value $I_m^*$ and the exciting current component $I_m$, while in the former, the current component calculating circuit 15' is used to calculate only the torque current component $I_t$ and the predetermined exciting voltage command value $V_m^*$ is produced from the exciting voltage command circuit 26. The principle of calculating the torque current component $I_t$ in the current component computing circuit 15' and the actual arrangement of the circuit are quite the same as in the embodiment of FIG. 2, and the operations of the other circuits are just the same as in FIG. 2, thus the description thereof being omitted here.

In this embodiment, as described above, the current component $I_t$ of the primary current is detected as a DC amount, and the current control circuit calculates on DC signals to finally control AC currents. Since the current control circuit treates DC signals, it is irrespective of the operation frequency and therefore no response delay problem is caused. Therefore, a torque proportional to torque command is always obtained to control the speed with high accuracy.

This embodiment further has the following effect. If the compensating circuit of the current controlling circuit 17 has an integrating element provided, the ripple included in the current $I_t$ can be smoothed by the integration action of the compensating circuit, and therefore the ripple can be excluded from the output $V_t^*$ of the current control circuit 16. Also the $V_m^*$ has no ripple. Thus, upon PWM control, no noise is caused in the voltage command, preventing the switching element of the power converter 2 from erroneously turning on and off by the ripple component.

While the voltage command value $V_m^*$ from the exciting voltage command circuit 26 is a constant value as described above, the voltage command value $V_m^*$ may slightly be changed with the change of frequency and current, in which case more effect can be obtained.

Figure 12:
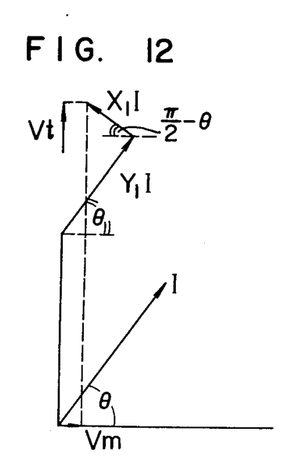
FIG. 12 is a vector diagram of the relation between the exciting voltage and effective voltage.

FIG. 12 is a voltage vector diagram useful for explaining the above. From FIG. 12, the exciting voltage component $V_m$ is expressed by $$V_m = r_1 I \cos\theta - x_1 I \sin\theta \quad (20)$$

From FIGS. 9A and 10A, the following equation is satisfied:

$$\left.\begin{array}{l} \cos\theta = \dfrac{I_m}{I} \\ \sin\theta = \dfrac{I_t}{I} \end{array}\right\} \quad (21)$$

Substituting Eq. (21) into Eq. (20) will yield $$\begin{aligned} V_m &= r_1 I_m - x_1 I_t \\ &= r_1 I_m - 2\pi f\, l_1 I_t \end{aligned} \quad (22)$$

From Eq. (22) it will be seen that $V_m$ may be the function of the primary frequency f and the torque current $I_t$.

Figure 13:
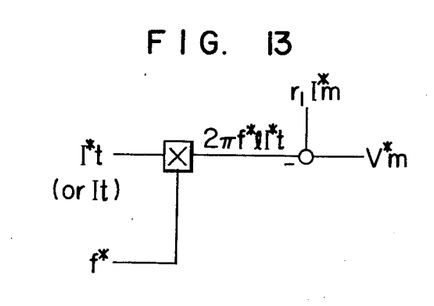
FIG. 13 is a block diagram of a partial modification of the embodiment of FIG. 11.

FIG. 13 shows a circuit for determing the exciting voltage command value $V_m^*$ on the basis of Eq. (22).

The operation of the circuit will not be described since it is easily understood from the figure.

Although the equivalent primary value $l_2'$ to which the secondary leakage reactance $l_2$ is converted is neglected in FIGS. 8 to 10 and 11, this value can be taken into consideration by using $$l_1 + \dfrac{l_m}{l_m + l_2'} \cdot l_2'$$

instead of $l_1$ in Eq. (22), thereby permitting more accurate control.

While description has been mainly made such that the power converter 2 shown in the embodiments of FIGS. 2, 7 and 11 is a PWM system, it may be of other systems, for example, a cyclo-converter to which this invention can of course be applied suitably.

Figure 14:
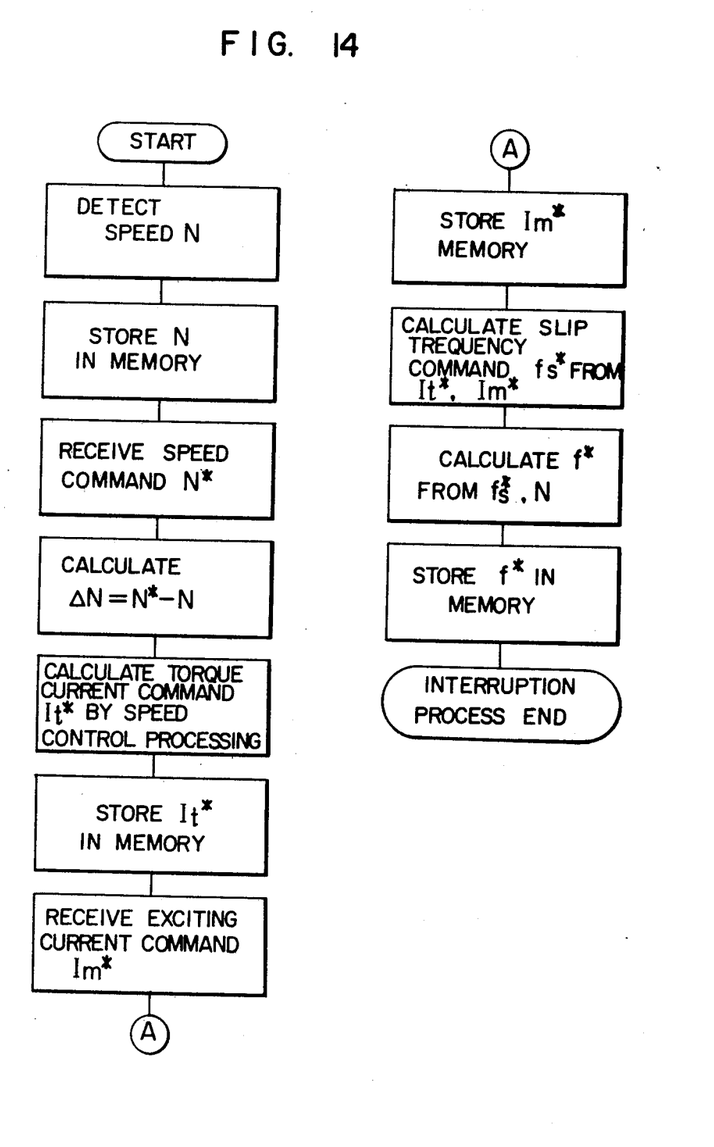
FIGS. 14 and 15 are flow charts of the operation of the embodiment of FIG. 2 when the operation is achieved by using a microcomputer.
Figure 15:
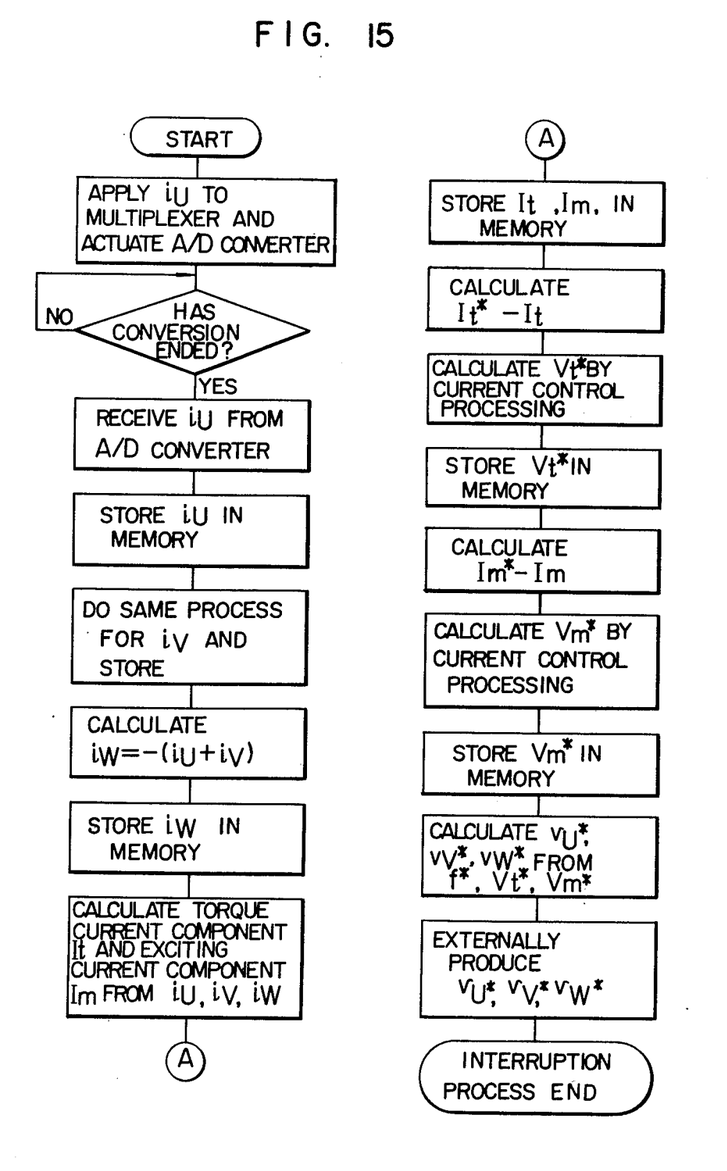

Also, the above embodiments can include a device having computing functions, such as a microcomputer. FIGS. 14 and 15 are respectively flow charts of the speed controlling task and current controlling task in the embodiment of FIG. 2. In the embodiments of FIGS. 7 and 11, the same flow chart can of course be used.

We claim:

1. An apparatus for controlling an induction motor comprising:
   an induction motor driven by power converting means;
   means for producing an effective current command value for said induction motor on the basis of a speed command value and an actual speed value;
   means for producing a slip frequency corresponding to the magnitude of said effective current command value;
   means for producing a primary frequency command value on the basis of said slip frequency and said actual speed value;
   current component detecting means for detecting a primary current of said induction motor so as to produce in the form of a DC signal an actual effective current value which is an effective component of the detected primary current;
   first current controlling means for producing an effective voltage command value in the form of a DC signal on the basis of said actual effective current value and said effective current command value; and
   converter controlling means for controlling the output of said power converting means on the basis of said effective voltage command value, said frequency command value and a predetermined exciting voltage command value given in the form of a DC signal.

2. A controlling apparatus according to claim 1, wherein said current component detecting means further produces in the form of a DC signal an actual exciting current value which is an exciting component of the detected primary current, and wherein said apparatus further comprises second current controlling means for producing said exciting voltage command value on the basis of said actual exciting current value and a given exciting current command value.

3. A controlling apparatus according to claim 1 or 2, wherein said converter controlling means instructs said power converting means with instantaneous value of each phase voltage of said induction motor.

4. A controlling apparatus according to claim 3, wherein said converter controlling means includes oscillation means for producing sinusoidal signals having a frequency coincident with said frequency command value and a phase coincident with the magnetic flux axis of said induction motor, and means for instructing said instantaneous value of each phase voltage on the basis of said sinusoidal signals, said effective voltage command value, and said exciting voltage command value.

5. A controlling apparatus according to claim 4, wherein said oscillation means has a plurality of read-only memories each responsive to said frequency command value to produce said sinusoidal signals.

6. A controlling apparatus according to claim 5, wherein said current component detecting means produces current components on the basis of the detected instantaneous primary current value of each phase and said sinusoidal signals.

7. A controlling apparatus according to claim 2, wherein said converter controlling means includes means for producing a magnitude command value of the primary voltage of said induction motor on the basis of said exciting voltage command value and said effective voltage command value, means for calculating the phase of voltage with respect to the magnetic flux axis on the basis of said exciting voltage command value and said effective voltage command value, means for producing sinusoidal signals on the basis of said phase and said frequency command value, and means for instructing said power converting means with an instantaneous value of each phase voltage on the basis of said primary voltage magnitude command value and said sinusoidal signals.

8. A method of controlling an induction motor which is driven by a power converting means, comprising the steps of:

comparing a speed command value and an actual speed value to produce an effective current command value for said induction motor;

determining a slip frequency corresponding to the magnitude of said effective current command value;

producing a primary frequency command value on the basis of the determined slip frequency and the actual speed value;

detecting a primary current of said induction motor so as to produce in the form of a DC signal an actual effective current value which is an effective component of the detected primary current;

producing an effective voltage command value in the form of a DC signal on the basis of said actual effective current value and said effective current command value; and controlling the output of said power converting means on the basis of said effective voltage command value, said frequency command value, and a given exciting voltage command value in the form of a DC signal.

9. A method according to claim 8, wherein said method further comprises the steps of producing in the form of a DC signal an actual exciting current value which is an exciting component of the detected primary current and producing said exciting voltage command value on the basis of said actual exciting current value and a given exciting current command value.

10. A method according to claim 8 or 9, wherein said method further comprises the steps of producing sinusoidal signals having a frequency coincident with said frequency command value and phases coincident with the magnetic flux axes of said induction motor, and instructing said power converting means with an instantaneous value of each phase voltage on the basis ,34 of said sinusoidal signals, said effective voltage command value and said exciting voltage command value.

11. A method according to claim 9, wherein said method further comprises the steps of producing a primary voltage magnitude command value for said induction motor on the basis of said exciting voltage command value and said effective voltage command value, computing the phase of voltage with respect to the magnetic flux axis on the basis of said exciting voltage command value and said effective voltage command value, producing sinusoidal signals on the basis of said phase, and instructing said power converting means with instantaneous value of each phase voltage on the basis of said primary voltage magnitude command value and said sinusoidal signals.

* * * * *